March 9, 1943.   C. MIDWORTH   2,313,352

ELECTRICAL MEASURING INSTRUMENT

Filed Jan. 5, 1940

Inventor
Cyril Midworth
by
Ralph B. Stewart
Attorney

Patented Mar. 9, 1943

2,313,352

UNITED STATES PATENT OFFICE 2,313,352

ELECTRICAL MEASURING INSTRUMENT

Cyril Midworth, Chiswick, London, England, assignor to Evershed & Vignoles Limited, Chiswick, London, England, a British company Application January 5, 1940, Serial No. 312,598
In Great Britain November 18, 1939

6 Claims. (Cl. 171—95)

This invention relates to the moving elements of electrical measuring instruments of the moving coil type. More particularly, it is concerned with ratiometer instruments in which the moving system comprises a pair of coils mounted back-to-back, that is to say a pair of coils having a common central plane. In such instruments, the moving system is mounted so that when it rotates from the position of rest, one of the coils moves into a stronger magnetic field and the other into a weaker field until the torques exerted by the two coils are balanced. The necessary disposition of the field is obtained by making the pole faces of the magnet eccentric to the core-iron embraced by the moving coils or by suitable shaping of the pole faces or core-iron in the axial direction of the moving system.

Hitherto it has been usual to wind the coils on separate metal formers which produce the necessary damping action as a result of the eddy-currents induced in them, the adjoining parallel limbs of the two formers being clipped together and holders for the pivots being secured to members attached to the appropriate limbs of the formers.

The question of damping is more difficult with back-to-back coils than with a coil which extends the full width of the moving element because the electromagnetic damping effect varies as the square of the length of the metal former in which the electromotive force setting up eddy-currents can be induced and is inversely proportional to the resistance of the former and, therefore, to the total length thereof. Of course, if impregnated coils without formers are employed, there is no eddy-current damping.

The object of the invention is to provide a moving-system with back-to-back coils without formers which shall be rigid and strong, have satisfactory mountings for the pivots and shall also provide as effective eddy-current damping as possible.

According to the present invention, a moving-element for an electrical measuring instrument of the kind referred to above is provided with a pair of coils, without formers, mounted back-to-back and with a continuous metallic shroud or frame which surrounds the pair of coils, holds them rigidly together and carries the pivot holders or the bearings for the movement. One or more layers of insulating material may be inserted between the coils which are thus converted into a rigid unit by the shroud, and the pivot holders, or alternatively the bearing cups, may be soldered to the shroud.

In order that the invention may be clearly understood and readily carried into effect, one form of construction in accordance with the invention will now be described, purely by way of example, with reference to the accompanying drawing, in which.

Figure 1:
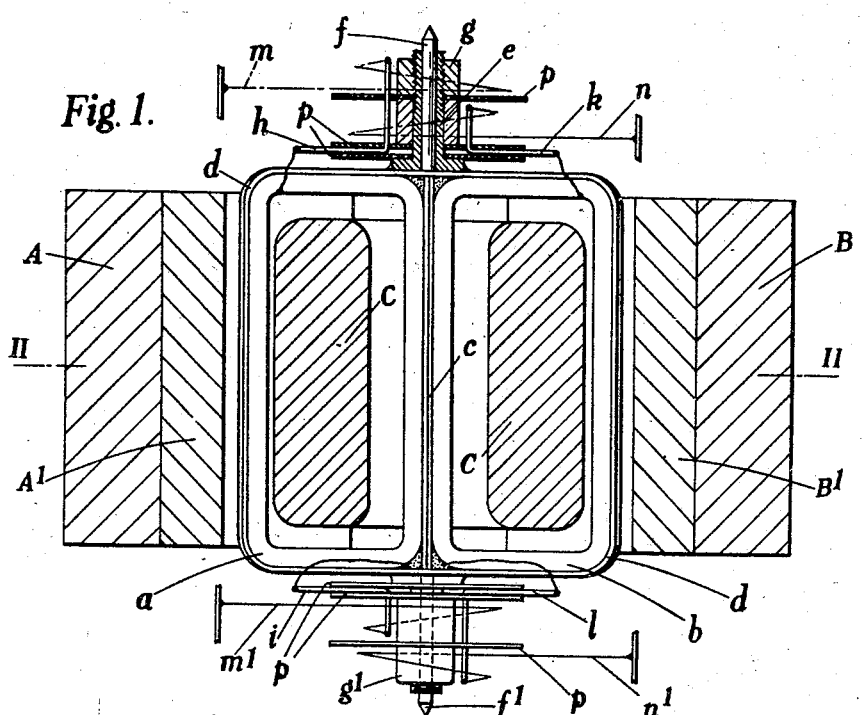
Figure 1 is an elevation, partly in section, of the moving system of the instrument and the adjacent parts of the permanent magnet and core-iron taken on a plane through the axis of the moving system.
Figure 2:
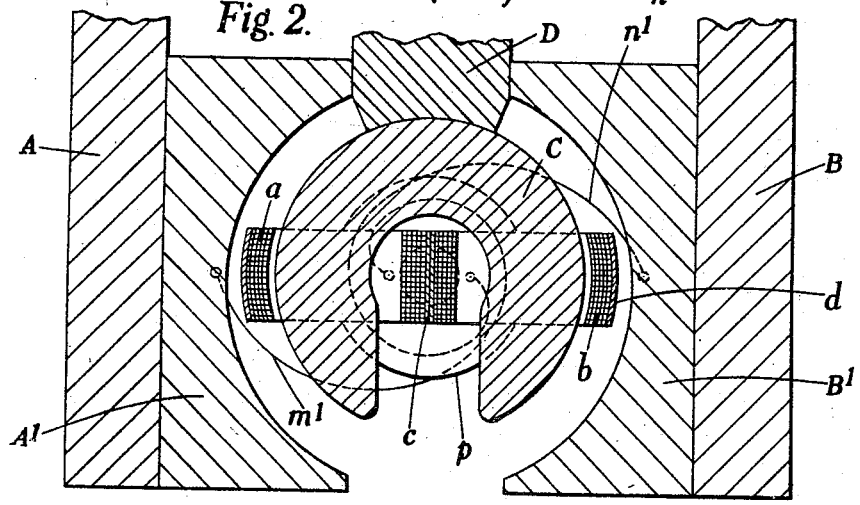
Figure 2 is a section on the line II—II in Figure 1.

Referring now to Figures 1 and 2, the limbs A and B of the permanent magnet are respectively fitted with pole-pieces A' and B', and the usual core-iron C is mounted on a support D. There are two substantially rectangular coils $a$ and $b$ which are arranged back-to-back with layers $c$ of insulating material sandwiched between them, and the assembly of the two coils is surrounded by a continuous metallic shroud $d$. The pair of coils $a$ and $b$, which are without the usual metal formers, are wound on a chuck and then cemented into the metallic shroud $d$.

Holders $e$ for the steel pivots $f$ and $f'$ of the moving coil assembly are soldered centrally at the top and bottom of the shroud $d$, and ligament drums and clamp nuts $g$ and $g'$ made of insulating material are screwed on to the respective pivot holders $e$. The ends of the coil windings are brought out to copper connectors $h$, $i$, $k$, $l$, which are clamped and held in position by means of mica discs $p$. The latter also serve as guards for ligaments $m$, $m'$, $n$, and $n'$ made of thin phosphor bronze strip exercising and inappreciable controlling torque on the moving system.

As an alternative to mounting the steel pivots $f$ and $f'$ and their holders $e$ on the shroud $d$, in which case the usual jewel bearings for the pivots are carried by the frame of the instrument, the jewels may be mounted in cups which are soldered to the shroud in place of the pivot holders $e$, the pivots $f$ and $f'$ being adjustably mounted in the frame of the instrument. In this alternative arrangement, the cups holding the jewels are screw-threaded externally, like the pivot holders $e$, to receive the clamp nut $g$, and the rim of the cup is turned inwardly so as to retain the jewel in place.

It will be seen from Figure 2 that the core-iron C and the moving system are disposed eccentrically with respect to the pole-pieces A' and B' of the magnet and, as a result, whenever the moving system is deflected from a given position, the outermost limb of one coil moves into a stronger magnetic field, whereas that of the other coil moves into a weaker field. In a particular case, the air gap varied in thickness from about 50 mils to about 80 mils and the pivotal axis of the moving system was at about 22 mils off-centre.

It will be appreciated that in addition to rendering the moving coil assembly extremely rigid and providing a firm foundation for the pivots, the metallic shroud $d$ serves for the circulation of eddy-currents which result in efficient damping of the system which would otherwise not be obtained since the coils are without the usual metal formers.

The damping action which results from the provision of the metallic shroud $d$ is considerably greater than would be obtained if the coils $a$ and $b$ were wound on separate formers, as has been the practice hitherto. The damping effect is determined by the power which is dissipated in the form of eddy-currents, and is therefore proportional to $$\frac{E^2}{R}$$

(where E represents the induced electromotive force producing the eddy-currents and R is the resistance of the closed circuit in which these currents circulate). Now, assuming that the length of each of the four sides of the shroud $d$ is L, the total resistance will be proportional to 4L, and the induced electromotive force will be proportional to 2L, bearing in mind that only the electromotive forces acting in two of the sides of the shroud are effective. This leads to the result that the damping effect is proportional to $$\frac{(2L)^2}{4L}$$

viz. L.

Applying this same reasoning to the case where the coils $a$ and $b$ are wound on separate metal formers in the absence of the shroud $d$, it is seen that the total length of each former is approximately 3L, and the effective electromotive force is now proportional to L. Accordingly, the damping effect produced by each former is proportional to $$\frac{L^2}{3L}$$

and for the two together it is proportional to ⅔L. This approximate comparison between the two cases demonstrates that the damping effect obtained with the prior construction is only about two-thirds of that obtained by means of the present invention. Actually, of course, it is rather less than two-thirds, because the length L is necessarily greater in the case of the present invention.

Figure 3:
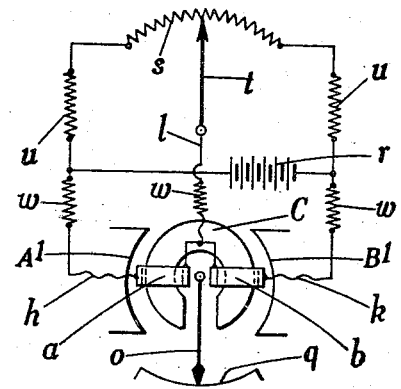
Figure 3 is a diagram of connections showing the instrument connected as a ratiometer indicator.

Referring now to Figure 3, which shows the connections when the instrument is to be used as a ratiometer indicator, the position of the moving system at any time is indicated, as usual, by a pointer $o$ co-operating with a graduated scale $q$. A battery $r$ is connected across the coils $a$ and $b$, which are in series with each other, and is also in circuit with a resistance $s$ having a movable contact arm $t$ which is connected to the junction between the windwings of the coils $a$ and $b$. Two resistances $u$ of equal value are connected symmetrically, as shown, and serve to limit the current flowing through the resistance $s$. Also, current-limiting resistances $w$ are connected in the leads to the coils as shown.

The position taken up by the moving system and its pointer $o$, at any time, is determined by the position of the contact arm $t$ on the resistance $s$, since the potential drop along one section of this resistance is applied to the coil $a$ and that along the other section is applied to the coil $b$. In other words, the position taken up by the pointer $o$ is governed by the ratio of the respective amounts of the resistance $s$ tapped off by the arm $t$.

I claim:

1. A moving element for an electrical measuring instrument of the moving coil type, comprising a pair of coils disposed back-to-back in a common plane, and a continuous metallic shroud surrounding said pair of coils in said common plane, said shroud forming only one closed path for damping currents and serving to hold said coils rigidly together.

2. A moving element for an electrical measuring instrument of the moving coil type, comprising a pair of coils disposed back-to-back in a common plane, a continuous metallic shroud surrounding said pair of coils in said common plane, said shroud forming only one closed path for damping currents and serving to hold said coils rigidly together, and pivotal bearing means mounted on said metallic shroud.

3. A moving element for an electrical measuring instrument of the moving coil type, comprising a pair of coils disposed back-to-back in a common plane, said coils being without formers, a continuous metallic shroud shaped to fit snugly around the outside of said coils in said common plane, said continuous metallic shroud forming only one closed path for damping currents and serving to hold said coils rigidly together and bearing means mounted on said metallic shroud.

4. A moving element for an electrical measuring instrument of the moving coil type, comprising a pair of coplanar substantially rectangular formerless coils disposed back-to-back in a common plane, at least one layer of insulating material sandwiched between said coils, a substantially rectangular continuous metallic frame fitting closely around the outside of the structure formed by said coils in said common plane, said continuous metallic shroud forming only one closed path for damping currents and serving to hold said coils rigidly together and a pair of centrally arranged pivot holders secured respectively to opposite sides of said metallic frame.

5. A moving element for an electrical measuring instrument of the moving coil type, comprising a pair of co-planar formerless coils disposed back-to-back in a common plane, a continuous metallic shroud embracing the structure formed by said coils in said common plane, said continuous metallic shroud forming only one closed path for damping currents and serving to hold said coils rigidly together, and a pair of pivots mounted respectively on two opposite sides of said metallic shroud.

6. A ratiometer instrument comprising, in combination, a permanent magnet, a core-iron arranged eccentrically with respect to the pole faces of said magnet, a pair of formerless coils disposed back-to-back in a common plane and embracing said core-iron and centrally located with respect thereto, current connections to said coils, a continuous metallic shroud fitting snugly around the outside of said coils in said common plane, said continuous metallic shroud forming only one closed path for damping currents and serving to hold said coils rigidly together and pivotal bearing members centrally mounted on two opposite sides of said metallic shroud.

CYRIL MIDWORTH.